United States Patent [19]

Abbe et al.

[11] Patent Number: 4,702,101

[45] Date of Patent: Oct. 27, 1987

[54] APPARATUS AND METHOD FOR TESTING THE CALIBRATION OF A HARD DISK SUBSTRATE TESTER

[75] Inventors: David C. Abbe; George A. Burt, Jr., both of San Jose, Calif.

[73] Assignee: ProQuip, Inc., Santa Clara, Calif.

[21] Appl. No.: 764,654

[22] Filed: Aug. 12, 1985

[51] Int. Cl.$^4$ ............................................. G01C 25/00
[52] U.S. Cl. ..................................................... 73/1 R
[58] Field of Search .................. 73/1 R, 1 J, 104, 105; 360/25; 369/54, 58

[56] References Cited

U.S. PATENT DOCUMENTS

| | | | |
|---|---|---|---|
| 3,539,912 | 11/1970 | Wardle | 73/1 R |
| 3,686,682 | 8/1972 | Behr et al. | 360/25 |
| 3,761,905 | 9/1973 | Hollstein, Jr. et al. | 360/25 |
| 4,532,802 | 8/1985 | Yeack-Scranton et al. | 360/25 |

Primary Examiner—Stewart J. Levy
Assistant Examiner—Robert R. Raevis
Attorney, Agent, or Firm—Thomas A. Turner, Jr.; Seymour A. Scholnick

[57] ABSTRACT

An apparatus for testing the calibration of hard disk substrate tester includes a calibrating micrometer moving a known surface to at least two distances from a non-contact detector in the hard disk surface tester and a known distance from each other, and further includes a piezoelectric transducer mounted to the known surface moved by the calibrating micrometer, and an oscillator oscillating the surface at predetermined frequencies and amplitudes. A method for determining the status of calibration of the hard disk substrate tester places a known surface at least two distances from or positions in relation to a surface detector in the hard disk substrate tester, determining the distance between these positions, driving the known surface usually by generating an oscillation thereof by a piezoelectric transducer at one or at a set or plurality of predetermined monotone frequencies and amplitudes, and determining the calibration of the hard disk substrate tester by comparing its output with the corresponding predetermined frequency and amplitude of the driven surface.

20 Claims, 8 Drawing Figures

U.S. Patent   Oct. 27, 1987   Sheet 1 of 4   4,702,101
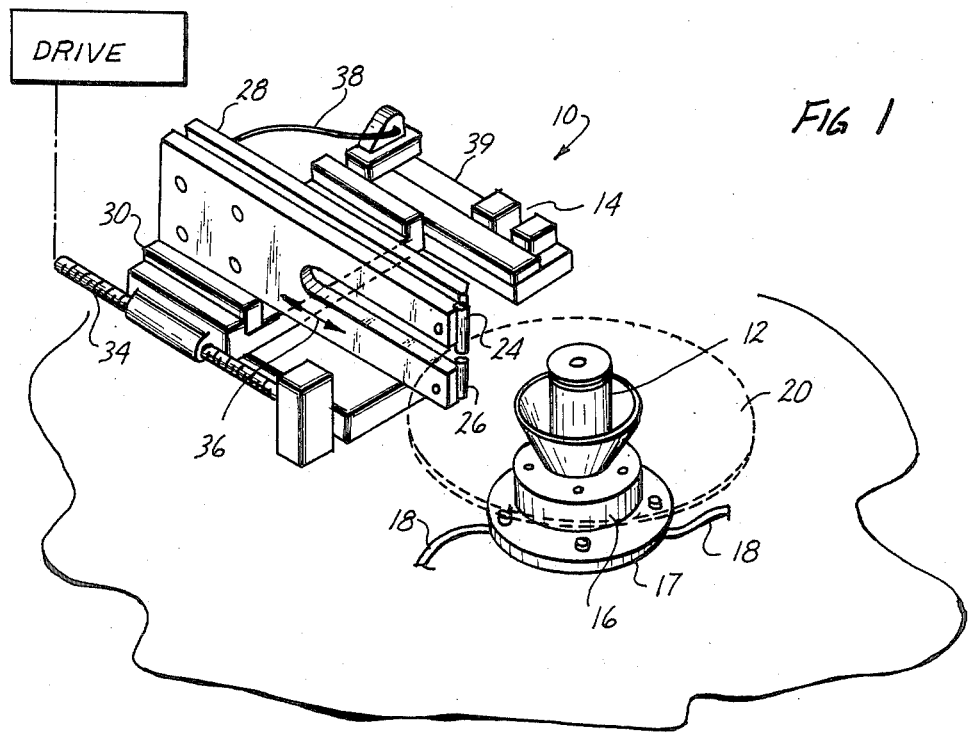
FIG 1
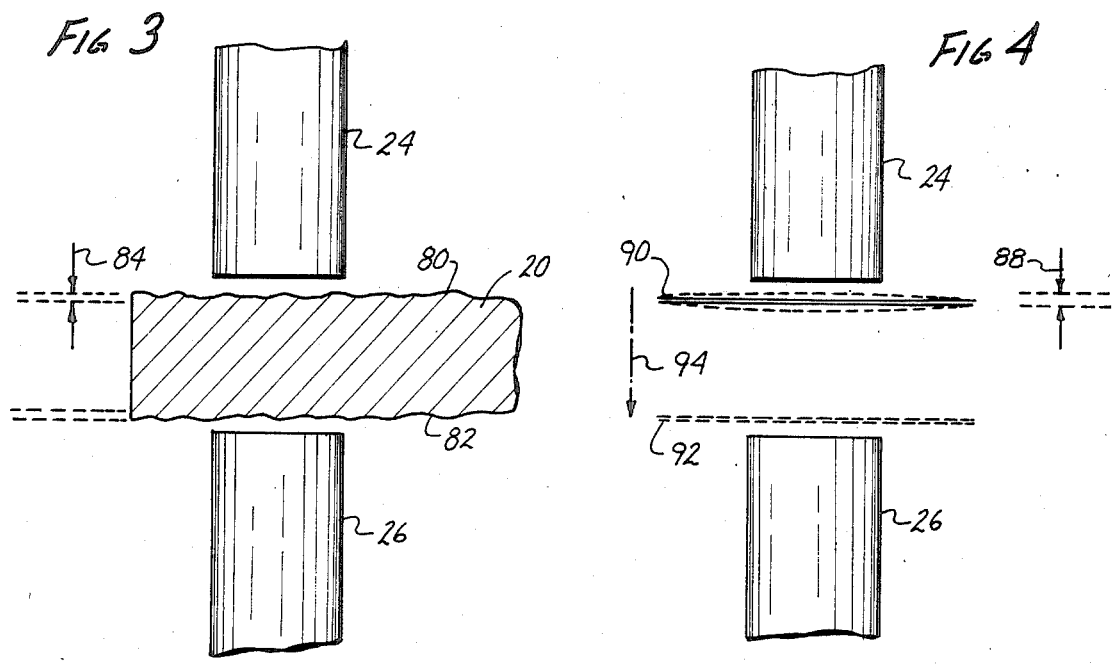
FIG 3
FIG 4

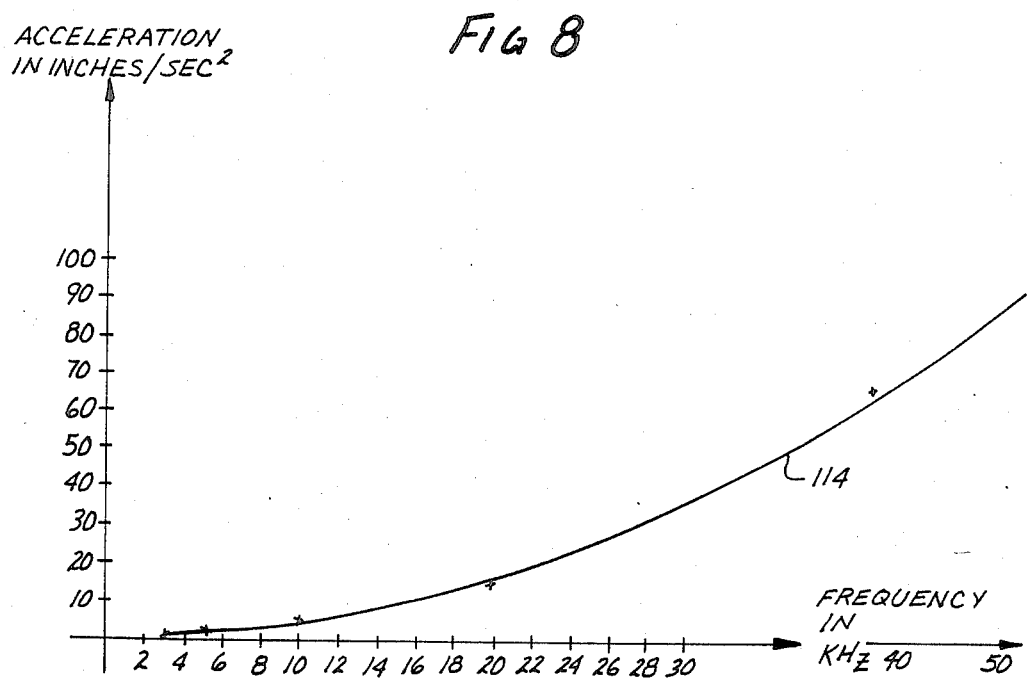

APPARATUS AND METHOD FOR TESTING THE CALIBRATION OF A HARD DISK SUBSTRATE TESTER

BACKGROUND OF THE INVENTION

1. Field of Invention

The present invention relates to the art of verifying and testing the calibration of test sensors, and more particularly apparatuses for comparing the output of surface detectors with known movements, and to a method for determining the status of calibration of object detectors in comparison with known object movements.

2. Description of the Prior Art

In the past, apparatuses for measuring accelerations and displacements caused by surface variations on the surface of a hard disk, herein sometimes designated as "hard disk surface testers" or "hard disk substrate testers," have been provided having read-out or pick-up heads or sensors borne over the surface of the hard disk having information designed for either a magnetic or optical reading therefrom. Hard disks conventionally have been made of aluminum, glass or plastic material and, while every effort is made to make the surface of the information bearing hard disk as smooth as possible, variations in the axial direction occur in that surface. Hard disks on which such information has been stored frequently are circular in shape, designed to be rotated about a center axis on a turnable, capstan or spindle, and the plane of the surface is generally perpendicular to that axis. Some information bearing surfaces may not be circular, but in all events hereinafter in this specification, the "axial direction" is used to mean the direction perpendicular to the plane of the surface of the information bearing medium.

Optically and magnetically encoded information recorded on hard disks is retrieved by pick-up heads. One frequently used method of retrieving such information is to mount such a pick-up head on an airborne slider which maintains the pick-up head and the slider in non-contact relationship with the disk so as to eliminate wear frequently found by contact-type pick-up head arrangements. The slider is airbone above the surface of the hard disk at a distance determined usually by the air currents naturally developed by virtue of the speed at which the disk is rotated about its axis. Such a distance or clearance in the axial direction above the surface of the disk is approximately two one-hundred-thousandths of an inch or less (0.0002"). The air pressure developed between the slider and the disk is normally such as to maintain the slider constant at this distance from the surface of the disk if the disk is smooth. Even when the disk's surface is characterized by long and rolling hills and valleys, the air pressure can keep the slider very close to a constant axial distance from the surface. There will, of course, be accelerations in the slider as it approaches a hill or a valley where the effects of inertial vectors of the velocity and of the change in velocity of the slider cause it to change slightly upward, downward or perhaps in other directions in its distance or displacement from the disk surface and information tracks on that surface. Hereinafter in this specification, the term "acceleration," unless specified otherwise, will be used to denote these effects in the axial direction. It is understood that the slider may be subject to vector components of acceleration in other directions, and that total acceleration is the result of energy of an absolute quantity regardless of relative direction or orientation.

Very frequently mass produced hard disks can have predictable hills and valleys which cause accelerations to the airborne slider, and will create a non-constant distance between the slider and the surface of the hard disk with only slight accelerations and displacement variations of the slider. Such accelerations and displacement variations can, however, go beyond tolerable limits, beyond which the optical or magnetic pick-up head or sensor is unable to reliably read data from that surface. Such reliability can be destroyed even by closely spaced waves or ripples in that surface. Such disturbances can cause great accelerations to the sensor, sometimes measured in the hundreds or thousands of inches per second per second. These disturbances and like physical defects on the surface of the disk are generally called "axial runout" effects and the concomitant acceleration experienced by the slider is denoted as the "runout velocity acceleration" effect or "RVA", which is a common reference term used in the industry for all of these resultant disturbances on the slider.

It is important for purchasers of hard disks to known within reasonably close tolerances the topographical characteristics and features of the hard disk surface. In high speed reading and random access data and memory implanting and retrieving, the airborne slider is designed to ride very close to the hard disk surface. Moreover, the more dense the information channels or tracks on the hard disks are, the closer the slider must be to the hard disk surface for accurate and isolated information implantation and retrieval. The closer that the slider rides to the surface, however, the more profound and consequential are the effects of surface variations on the speed and clearance of the slider relative to that surface. For the most part, these effects cause accelerations and energy transfers (RVA) to the slider. Such accelerations which act upon the slider and the pick-up or sensing head will, if they are too great, cause the slider to deviate away from the desired track or path of movement so that reliable reading or data encoding cannot be accomplished. Such accelerations may even cause the slider to fail catastrophically such as in an actual contact between the slider and the hard disk's surface. Therefore, if the intolerable topographical characteristics (RVA) of the hard disk surface are known to a prospective purchaser, the purchaser will be able to determine accurately and precisely how far above the hard disk's surface the airborne slider can be maintained without accelerations that will cause failure of the slider to maneuver efficiently, speedily and accurately over the hard disk's surface.

Disk rotation speeds and the axial displacement or clearance of the slider from the disk's surface are parameters which are normally predetermined by externally imposed specifications and operating requirements. If the effects of the topographical surface characteristics, particularly the RVA, of the hard disk can be accurately predicted or tested with reliable test results, the suitability of the hard disk to a particular job application can be determined. It has long been desired to have disk surface or substrate testers that will accurately give quantitative determinations of the variations or displacements in such a hard disk substrate or surface, and to give quantitatively accurate predictions of the effects of the topographical characteristics on the performance of a slider on that surface.

Hard disk surface testers have been provided before, and are offered by a number of manufacturers. Such testers run a probe over the disk surface in the form of a non-contact, optical, magnetic or capacitive sensor, one of the more frequently seen having a 0.066 inch diameter capacitive plate with a stand-off distance of 0.01125 inches from the disk surface. In effect, a capacitive plate forms the sensing capacitor probe which, with the disk surface itself, forms the capacitor whose capacitance is measured in an electric circuit. At the desired spin or disk rotation speed, the sensor is made to traverse radially to the radial center of the disk while the tracks or grooves of the disk are spun under it. Such disk testers can accurately reflect variations or displacement of the disk's surface and its topography in relative terms, and can give output read-outs in relation to the correlative starting value of the sensor.

Thus, it might be possible with testers now available to locate the positions of greatest run out, velocity and acceleration and to have a relative measurement of those parameters so long as a single disk surface tester is used. In many circumstances, serveral disk surface testers are employed, or attempts are made to compare in absolute, quantitative terms the results of one disk surface tester with the results of another. Presently there exists, however, no simple and expedient apparatus or method for correlating the read-outs and dynamic response curves of such testers one with another. It is stil sought but not provided to have a simple yet reliable apparatus and method for correlating the read-outs and dynamic response curves of several and indeed all disk surface or substrate testers.

The disk surface axial displacement, from which axial acceleration can be computed and determined, appears as an aberrant curve on, for example, an oscilloscope screen, and some relative measurement can be made of the aberrant cycle against graph lines on the oscilloscope screen. Such measurements, however, are in relation to the adjustment of the oscilloscope output and, therefore, there has been no way of correlating the dynamic waveform caused by such a particular surface displacement acceleration with an absolute, quantitative and determinable number that would represent the physical distance of axial displacement change caused by such RVA. Heretofore, there has not been provided, but has long been sought an accurate, simple and reliable method and apparatus for determining whether or not such hard disk substrate testers have output signals or information which are quantitatively accurate, or how far off quantitative accuracy such output information is.

SUMMARY

In brief, and in accordance with one aspect of the present invention, a hard disk substrate tester is described having a substrate or surface detector radially moved by a probe holder over a hard disk at high rotation speeds, for the purpose of detecting axial displacement of the surface of the hard and calculating accelerations of that displacement and other topographical characteristics such as RVA. A known calibrator surface is mounted within a calibrator mount for axial movement by a calibrating micrometer, it being understood that "axial" refers to the axial direction as defined hereinabove in relation to the axis of a hard disk mounted on a hard surface tester's capstan. The mount holding the calibrator surface and the calibrating micrometer is adapted to be adjustably mounted on the probe holder to place the calibrator surface in detecting relationship with the disk surface tester's detectors, in this instance comprising a non-contact capacitive type probe. The calibrating micrometer is described as capable of positioning the calibrator surface at at least two distances from the detector, and of calculating the displacement between these two distances.

The calibrator surface has a piezoelectric transducer mounted thereon for driving the surface at a known monotone frequency and amplitude of oscillation or at a selected one or a set of a plurality of monotone frequencies and amplitudes contemporaneously. The piezoelectric transducer is connected to a predeterminable energy source, for oscillating the calibrator surface at the known and preselected frequencies and amplitudes. The output signals and read-out of the disk surface tester can then be analyzed, and the output results compared with the known frequency and amplitude of the calibrator surface oscillation to determine the relative precision and calibration of the substrate tester.

A method for testing the calibration of a disk substrate or surface tester is described comprising the placement of a calibrator surface in detected relationship with the detector of the hard disk substrate or surface tester. The calibrator surface is axially displaced from the detector and its position noted on a calibrating micrometer. The calibrator surface is then moved to a second displacement distance from the detector, and the difference between the two displacements determined from the calibrating micrometer. The relative displacement calibration or accuracy of the disk substrate tester is then determined by comparing the difference in the output signals of the disk substrate tester for the two calibrator surface displacements with the measured displacement difference on the calibrating micrometer.

The calibrator surface is then oscillated at a known predetermined frequency and amplitude, or at preselected ones of a plurality of monotone frequencies and amplitudes. The axial displacement acceleration, determinable from the known frequency and amplitude oscillations of the calibrator surface, are then compared with the acceleration output signals of the disk substrate tester to determine whether the disk substrate tester is quantitatively accurate and in calibration or not.

Other novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be understood, however, that the drawings are for the purpose of illustration and description only, and are not intended as a definition of limits for the invention.

BRIEF DESCRIPTION OF THE DRAWING

FIG. 1 is a perspective view of a hard disk surface or substrate tester showing the environment of the preferred embodiment of the present invention;

FIG. 3 is a side elevation, partially cut-away view of the placement of a hard disk substrate in relation to the hard disk surface tester detectors;

FIG. 4 is a side elevation view of the calibrator surface of the preferred embodiment of the present invention in relation to the hard disk surface tester detectors;

FIG. 8 is a graphical illustration showing test results at a plurality of frequencies and amplitudes of the apparatus and method of the preferred embodiment of the present invention.

DESCRIPTION OF THE PREFERRED EMBODIMENT

Figure 2:
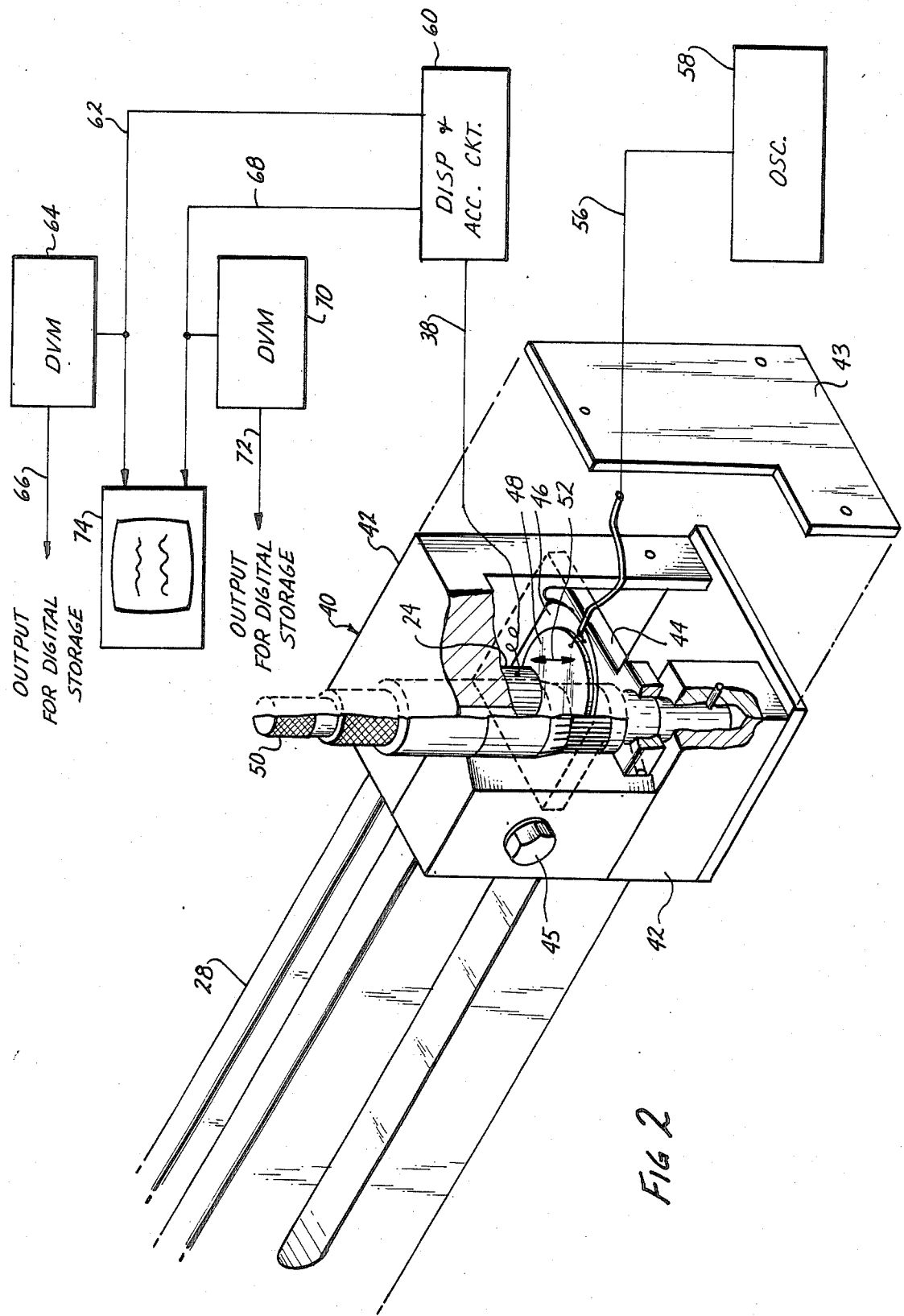
FIG. 2 is a perspective, partially cut-away view of a calibrator surface assembly of the preferred embodiment of the present invention in relation to the hard disk surface tester of FIG. 1.

The preferred embodiment of the present invention involves an apparatus and a method for testing the calibration of a hard disk substrate or surface tester which comprises for operating parts a disk chamber 10, reference initially being had to FIG. 1 of the drawings. The chamber 10 comprises a capstan or spindle 12 having an axial centerline 14. Tha capstan 12 is mounted through bearing 16 and mount plate 17 to the cabinet structure. The capstan 12 can be driven by air through hose 18. A typical hard disk, shown in FIG. 1 in phantom 20, can be axially mounted on the capstan 12 for high speed rotation.

Non-contact detectors 24, 26 comprising capacitive plates are mounted within probe holder 28. The probe holder 28 is movable by being mounted on mount 30. A motor drive 32 electromechanically turns screw drive 34 to move the mount 30 and probe holder 28 in the radial directions of arrow 36 relative to the disk 20 and capstan 12. The detectors 24, 26 are electrically connected in circuits 38 to a computing display and acceleration circuit mounted on plate 39. Such a tester, known as for example the ProQuip SU 4050, and information about its operation and structure are available from the assignee of the present patent.

In FIG. 2, a calibrator assembly 40 is shown in partial cut-away perspective having a calibrator assembly block 42 with a front plate 43 exploded away for clarity. The calibrator assembly 40 is mounted on probe holder 28 of the disk substrate tester of FIG. 1 so that its position on the upper forks of probe holder 28 can be radially adjusted in relation to the non-contact detectors 24, 26. The calibrator assembly block 42 is fixed to the probe holder 28 by tightening set screws 45, one on each side of the assembly block 42, and each of which set screws is designed to contact a corresponding upper fork of the probe holder 28. The calibrator assembly 40 comprises a calibrator surface mounting plate 44 having a calibrator surface 46 mounted thereon. The calibrator surface 46 has a piezoelectric transducer 48 mounted thereon in operative contact therewith.

A calibrating micrometer 50 having an accuracy of ±0.0001 inch is fixed to the assembly block 42 and movably holds the calibrator surface mounting plate 44. When the calibrating micrometer 50 is turned, the calibrator surface mounting plate 44, with the calibrator surface 46 and the piezoelectric transducer 48 are moved axially in the direction of arrow 52.

The piezoelectric transducer 48 is electrically connected in circuit 56 with the calibrator surface 46 and with an oscillator 58. When the oscillator 58 is driven at predetermined levels or quantities of energization, the piezoelectric transducer 48 will oscillate the calibrator plate 46 in the axial direction 52 at predeterminable frequency and amplitude as may be selected. In an alternative aspect of the preferred embodiment of the present invention, the oscillator 58 may drive the calibrator surface 46 and piezoelectric transducer 48 at one or at a set of a plurality of predeterminable and selectable monotone frequencies for purposes as will be explained in greater detail below.

The non-contact detector 24 comprises a capacitive plate connected by circuit 38 to a display and acceleration circuit 60. The display and acceleration circuit 60 has an output signal 62 connected to a digital volt meter 64 and to a display type output 74 comprising an oscilloscope having a visual output. The digital volt meter 64 is connected by its output 66 to digital storage means for permanent retention of the read-out of the detectors 24, 26.

Display and acceleration circuit 60 is similarly connected by circuit 68 to a digital volt meter 70 and to the same oscilloscope 74 with its visual output. Digital volt meter 70 is also connected at its output to digital storage means for a more permanent storage of the probe information.

In FIGS. 3 and 4, the relationship of the calibrator surface 46 in relation to the non-contact detectors 24, 26 is shown in greater detail. In FIG. 3, a hard disk 20 having variable surfaces 80, 82, is positioned between the upper detector 24 and lower detector 26. The surfaces of a hard disk 20 usually are not smooth, but have variations as depicted in cross-section for the top surface 80 and for the bottom surface 82. The variations or axial displacements overall are representatively shown by the arrow 84, it being understood that the drawing of FIG. 3 is not drawn to scale.

In FIG. 4, also not drawn to scale, the calibrator surface 46 is shown in a first position 90 in relation to upper detector 24. By movement of the calibrator micrometer 50, the calibrator surface 46 can be moved in the axial direction a distance 94 to a second position 92. Similarly, two positions can be established in relation to the lower detector 26 for testing its displacement calibration. When oscillating, the calibrator surface 46 will oscillate at the amplitude representatively shown by the distance 88.

Figure 5:
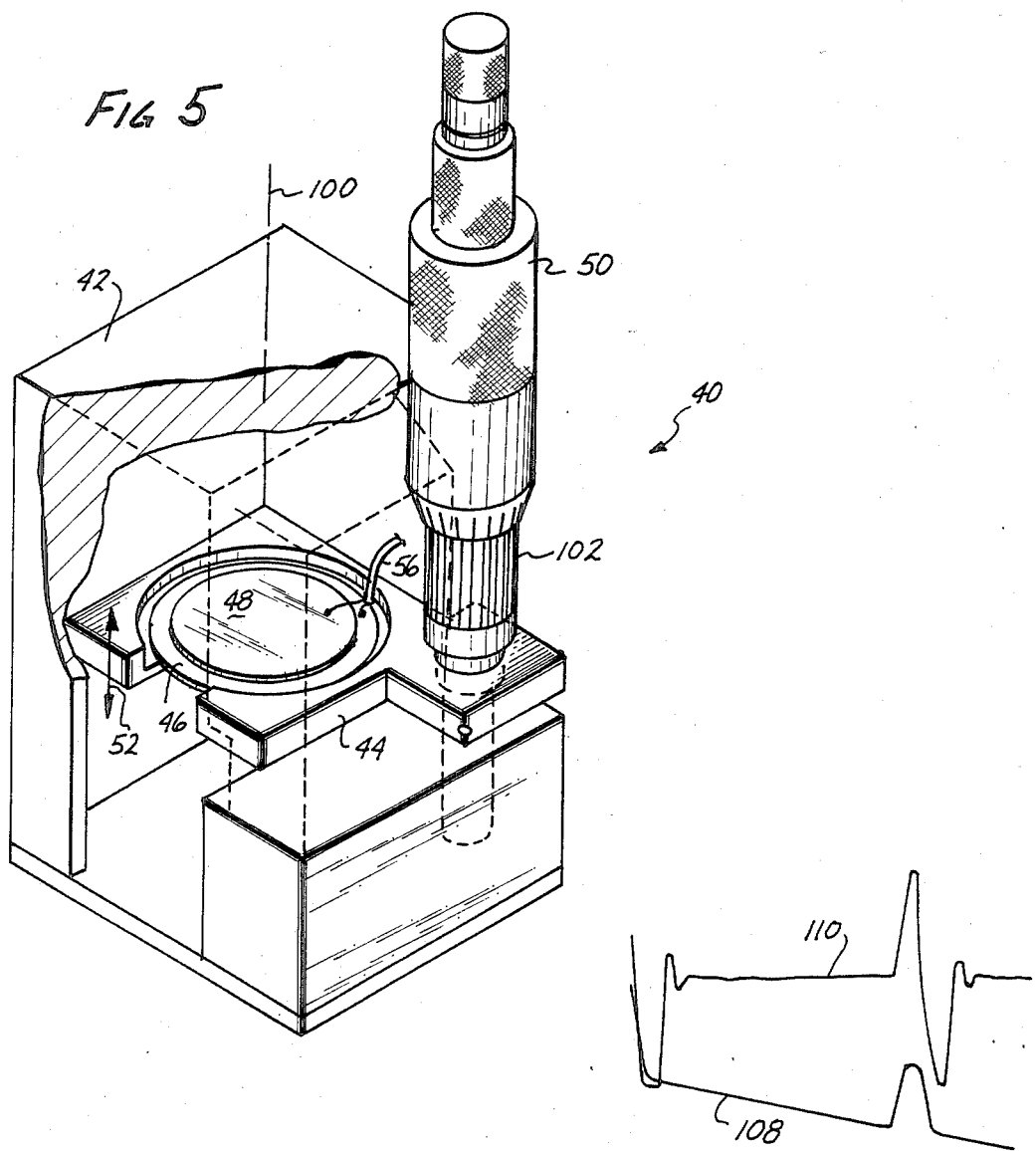
FIG. 5 is a perspective, partial cut-away view of the calibrator surface mount assembly of the preferred embodiment of the present invention.

FIG. 5 is a partially cut-away perspective of the calibrator assembly 40, showing the calibrator assembly block 42 having the front plate and other portions of the calibrator assembly block 42 removed and not shown in this figure for clarity. The calibrator surface 46 is mounted on axially movable calibrator surface mount 44, which can be moved in the axial directions of arrow 52 by rotating the calibrating micrometer 50 clockwise or counter-clockwise, depending on which of the directions of arrow 52 movement is desired. The calibrating micrometer 50 has a vernier scale 102 so that its position in relative terms can be determined to the closest thousands the ten-thousandths of an inch. The piezoelectric transducer 48 is mounted to the calibrator surface 46, and connected in electrical circuit 56 as described in greater detail above.

In operation, the calibrator assembly block 42 is mounted to the probe holder 28 while the disk 20 is removed or is not in place on the spindle 12. The calibrator assembly block 42 is slid radially, in relation to the centerline 14, on the upper forks of probe holder 28 until the calibrator surface 46 is positioned in relation to detectors 24, 26 so that, generally, the centerline 100 of the calibrator surface 46 (see FIG. 5) is in alignment with the centerline of the non-contact capacitive probes or detectors 24, 26. The calibrator surface 46 is set (FIG. 4) in relation to the detector 24, and position on the calibrating micrometer's vernier scale 102 noted. Concomitantly, the displacement position as represented in the output signals 62, 66 is noted for later reference. The calibrator surface 46 is then moved to a second position 92 a known and measured distance away from the first position 90. This distance is determinably known from the micrometer scale 102, and is compared with the change in displacement or distance noted by the output signal 62 visually read in the oscilloscope 74 or digitally recorded from the digital volt meter 64 in output signal 66.

The calibrator surface 46 is then oscillated at a known amplitude and frequency by energization of the coupled piezoelectric transducer 48 driven by oscillator 58 through circuit 56. The resulting oscillation of calibrator surface 46 is at a known amplitude 88, the displacement being detected by detector 24. The displacement detected by detector 24 is amplified by display and acceleration circuit 60 and visually observed on oscilloscope 74 through output 62. The displacement output is read digitally at output 66 from digital volt meter which receives its signal 62 from the display and acceleration circuit 60. The displacement on oscilloscope 74 will create an output waveform such as waveform 104 as seen best in FIG. 6 of the drawings.

Figure 6:
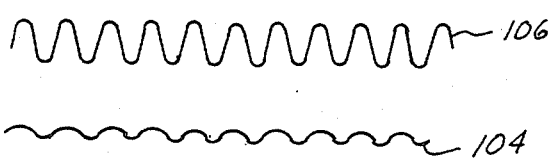
FIG. 6 is a graphical illustration showing a read-out of the method and apparatus of the preferred embodiment of the present invention.

The axial acceleration derivative of the axial displacement caused by the oscillation of calibrator surface 46 is calculated in display and acceleration circuit 60, and the acceleration given in output signal 68 from that circuit 60. The acceleration waveform as visually seen on oscilloscope 74 will be the waveform 106 as seen in FIG. 6 of the drawings. The acceleration 106 has its greatest components at the times when the displacement as seen in waveform 104 is going through its greatest rate of change. If the quantitative value of the axial displacement 104 and of the axial acceleration 106 as seen on the visual read-out of oscilloscope 74 or in the digital read-outs stored from the digital volt meters 64, 70, quantitatively are compared with the distance 88 of the oscillation of the calibrator surface 46, and of the acceleration calculated from that displacement oscillation, then the precision of the calibration of the substrate tester can be seen as being in calibration or out of calibration.

As may be appreciated from FIG. 3, the axial displacement of the surfaces 80, 82 of the disk 20 does not have the uniformity as is found in a precisely driven oscillation, such as that of the calibrator surface 46 by the oscillator 58 through the piezoelectric transducer 48. On the contrary, the accelerations in axial displacement on the surfaces 80, 82 will be sharp and high at some points along the irregular surfaces 80, 82, and more smooth or low at other points. The disk substrate tester may be precisely calibrated and its read-outs reliably faithful for some quantitative ranges of axial surface displacements and accelerations, but unreliable and unfaithful at others. Thus, it is desirable when trying to determine the reliability of the disk substrate tester, to compare the disk substrate tester's output at a plurality of frequencies which would correspond to the range of the rates of axial surface displacement and surface acceleration which aberrant disk substrates or surfaces could be expected to have.

Accordingly, it is believed that the disk substrate tester's reliability and calibration can be determined more faithfully by using the following preferred method of testing. Taking the disk substrate or surface tester 10 not having a disk on the spindle or capstan 12, the calibrator assembly 40 is mounted on the top forks of the probe holder 28 so as to position the calibrator surface 46 in alignment to be detected by detectors 24, 26, wherein the axis 100 of the calibrator surface 46 is generally aligned with the axes of the non-contact capacitive plates of the detectors 24, 26, as is shown in FIGS. 2 and 4 of the drawings. The calibrator surface 46 should be placed at one distance 90, reference being had to FIG. 4, from the detector 24. The output signal 62 of the detector circuit should be observed, and the position of the calibrating micrometer 50 should be observed for this position 90. The calibrator surface 46 then should be moved a distance 94 which could be predetermined to a new distance from detector 24, that is, the second position 92. The predetermined distance can be measured by turning the calibrating micrometer 50 the precise distance as indicated on the vernier scale 102, thus moving the calibrator surface mounting plate 44 in the direction of arrow 52.

Detector 24 will sense the second displacement position 92, and the display and acceleration circuit 60 will indicate the displacement distances from the detector 24 to the second position 92 by a corresponding signal 62 at oscilloscope 74 and at output 66. The difference between the output signal 62 from the first displacement position 90, and the output signal 62 for the second displacement position 92 is then compared with the precise distance measured on the micrometer scale 102. If they are equal, then the displacement calibration of the hard disk substrate tester is quantitatively accurate and reliable.

Should this displacement calibration be determined to be satisfactory, the calibrator surface 46 can then be moved into the first position 90 and oscillated a predetermined amplitude 88 by selecting an oscillation energy level in oscillator 58, and driving the piezoelectric transducer 48 and calibrator plate 46 the predetermined frequency and amplitude. The display and acceleration circuit 60 will produce as an output signal 68 the acceleration calculated upon the rate of change in the velocity of the axial surface displacement of the calibrator surface 46. If the axial surface displacement 104 on the oscilloscope screen 74 or in the output signal 72 compares and is equal to the known amplitude 88 of the calibrator plate 46 oscillation, one can determine that, at least at the frequency of oscillation selected for this test, the acceleration measured by the tester will be accurate.

As noted above, the variations in the surfaces 80, 82 of the hard disk substrate 20 (FIG. 3) will produce axial displacements as detected by detectors 24, 26 which will be comparable to a number of varying frequencies of oscillation in the dynamic calibrator plate 46. Normally it will not be sufficient in order to determine that the substrate tester is calibrated or reliably accurate to test at only a single frequency, since a single frequency will be comparable to only one particular axial displacement rate. Topographical deviations on the surfaces 80, 82, however, will cause a plurality of different rates of axial surface displacement and rates of change of that rate of axial surface displacement, i.e., acceleration, which will be related to or correspond with other frequencies of oscillation. Accordingly, to verify the calibration of a disk substrate tester, the acceleration output signal 68 can be verified against additional predetermined frequencies of axial surface displacement and of surface accelerations in a spectrum sufficiently wide so as to anticipate the expected axial surface displacement rates and surface accelerations over the entire disk surfaces, such as the surfaces 80, 82. Only if the response of the disk substrate tester is reliable over the range of frequencies selected can the disk substrate or surface tester be considered accurately calibrated for the purpose of testing disk substrates or surfaces. If the disk substrate tester proves unreliable at any of these additional frequencies, the entire disk substrate tester cannot be said to be in calibration or reliable.

In FIG. 8, a graph showing expected results of a disk substrate tester at a plurality of various oscillation frequencies of a calibrator plate used in accordance with the preferred embodiment of the method of the present invention for a typical hard disk substrate tester in general calibration is shown. The abscissa represents the frequency in kiloHertz at which the calibrator plate is operated, and the ordinate represents the calculated quantitative measurement of acceleration in inches per second per second. The line 114 represents the acceleration as predetermined and selected by being derived from the displacement of the calibrator surface or plate 46. The amplitude 88 of the calibrator surface oscillation for all frequencies used is identical, at one microinch from zero to peak. The cross marks represent acceleration outputs 68 of the disk substrate tester at, respectively, 3.0, 5.0, 10.0, 20.0 and 40.0 kHz. The use of a plurality of frequency determinations will, also, enable the determination, or at least a bracketing of at what frequency the filter frequently found in disk substrate tester operates.

In yet an alternative method of the preferred embodiment of the present invention, the calibrator plate 46 can be oscillated contemporaneously or simultaneously at a plurality of predetermined monotonic frequencies. The detectors 24, 26 will sense all of the various frequencies of axial surface displacement. The output signal 68 from the display and acceleration circuit 60 will contain the disk substrate tester's read-out output signal for surface accelerations for each of these frequencies, and the amplitude of the displacement so read for each of the frequencies can be read contemporaneously from the digital volt meter 64 and its output signal 66, or from the oscilloscope screen 74 for the different monotonic frequencies.

Figure 7:
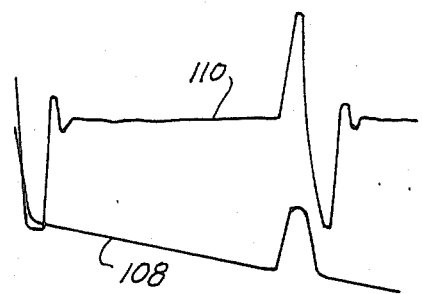
FIG. 7 is a graphical illustration showing a read-out of a hard disk surface tester of a hard disk.

When the calibration test method of the preferred embodiment of the present invention has determined that the disk substrate tester is, in fact, accurately calibrated, a disk substrate 20 can be placed on the spindle or capstan 12 and spun at high speeds. The detectors 24, 26, reference being had to FIG. 3 of the drawings, will then detect the axial surface displacement of the surfaces 80, 82. The output signal 62 for the axial displacement will appear from the displat and acceleration circuit 60 as waveform 108, reference being had to FIG. 7. Wave 108 shows an axial surface displacement occurring toward its end as shown in FIG. 7. The surface acceleration derived and calculated from the axial surface displacement 108, comprising the output signal 68 from the display and acceleration circuit 60, will appear on the oscilloscope 74 as waveform 110 in the graphical read-out of FIG. 7. The read-out signals 62, 66, 68, 72 for axial surface displacement and axial surface acceleration will be quantitatively accurate and quantitatively reliable as against an absolute standard and as against all other disk surface testers whose calibration has been quantitatively established.

The foregoing detailed description of our invention and of preferred embodiments, both as to apparatus and as to method, is illustrative of specific embodiments only. It is to be understood, however, that additional embodiments may be preceived by those skilled in the art. The embodiments described herein, together with those additional embodiments, are considered to be within the scope of the present invention.

We claim:

1. A testing apparatus for testing the calibration of a hard disk substrate tester that comprises at least one non-contact detector for sensing displacement in an axial direction of a surface of a rotatable hard disk substrate having an axis, comprising:
   a. positioning means for positioning a calibrator surface a distance in detectable proximity to said hard disk surface tester detector; and
   b. driving means for non-rotatably driving the calibrator surface in the direction of the axis at a predeterminable rate of acceleration in relation to the detector.

2. The testing apparatus of claim 1 wherein said driving means comprising oscillating means for oscillating in the axial direction the calibrator surface at at least one predeterminable monotonic frequency and at at least one predeterminable amplitude.

3. The testing apparatus of claim 2 wherein said driving means comprises oscillating means for oscillating in the axial direction the calibrator surface at a plurality of predeterminable and selectable monotonic frequencies and at a plurality of predeterminable and selectable amplitudes.

4. The testing apparatus of claim 3 wherein said driving means comprises oscillating means for oscillating in the axial direction the calibrator surface at a plurality of predeterminable and selectable monotonic frequencies contemporaneously.

5. The testing apparatus of claim 2 wherein the oscillating means comprises a piezoelectric transducer mounted in operatively driving relationship to said calibrator surface, and connected in circuit means for driving said piezoelectric transducer at at least one predeterminable monotonic frequency and at at least one predeterminable amplitude.

6. The testing apparatus of claim 5 wherein said circuit means is capable of driving said piezoelectric transducer at a plurality of predeterminable and selectable monotonic frequencies and amplitudes.

7. The testing apparatus of claim 6 wherein said circuit means is capable of driving said piezoelectric transducer at a plurality of predeterminable and selectable monotonic frequencies and at a plurality of predeterminable and selectable amplitudes contemporaneously.

8. The testing apparatus of claim 7 wherein said positioning means comprises means for positioning the calibrator surface a plurality of selectable distances in the axial direction from the detector, and further comprises means for precisely measuring the differences between said selectable distances.

9. The testing apparatus of claim 1 wherein said positioning means comprises means for selectively varying the distance of said calibrator surface from said hard disk substrate tester detector.

10. The testing apparatus of claim 9 wherein the positioning means comprises means for precisely measuring the difference between selected varied distances of said calibrator surface from said hard disk substrate tester.

11. The testing apparatus of claim 10 wherein the detectable relationships comprise varying distances in the axial direction.

12. The testing apparatus of claim 10 wherein the selectively varied distances comprise a plurality of selected discrete positions along the axial direction, and wherein the positioning means further comprises means for precisely measuring the differences between said selected discrete positions.

13. A testing apparatus for testing the calibration of a hard disk substrate tester that comprises sensing means for sensing displacement in a direction of an axis of a surface of a rotatable hard disk substrate having an axis, and comprising means for calculating accelerations corresponding to an axial velocity corresponding to an axial displacement of the hard disk surface in relation to the detector, and further comprising at least a first output signal corresponding to the axial displacement of the disk surface in relation to the detector, said sensing means comprising at least one non-contact surface detector and being operatively positioned in said hard disk substrate tester, comprising:

positioning means for positioning a portion of a calibrator surface in detectable proximity to said detector at at least a first and a second distances from said hard disk surface tester detector, and for precisely measuring the difference between said first and said second distances from said detector.

14. In a hard disk substrate tester for testing the surface of rotatable disks having an axis when rotated in said tester, where said disk substrate tester comprises a surface detector and an output from which are given readable output signals corresponding to axial displacement of the surface of said surface, a method for determining the accuracy of the output signals, in quantitative terms, corresponding to axial displacement of said surface in the direction of said axis, comprising the steps of:

a. positioning a portion of a calibrator surface in detectable proximity to said detector at a first axial position along said axial direction, and determining the first axial position of said calibrator surface on a quantitatively accurate scale measuring the axial direction;

b. displacing the portion of the calibrator surface along said axial direction to a second axial position a predeterminable distance from said first axial position, and determining the second axial position on said scale;

c. determining the difference in axial displacement between said first axial position and said second axial position; and d. determining from the output of said hard disk substrate tester whether said output signals correspond to the difference determination of the first and second axial positions of the calibrator surface.

15. A method for determining in absolute quantitative terms the accuracy of output signals of a hard disk substrate tester for testing the surface of rotatable disks an axis when rotated in said tester, where said disk substrate tester comprises a surface detector and an output from which readable output signals corresponding to axial accelerations derivative of the dynamic displacement of the axial surface in relation to said detector, comprising the steps of:

a. positioning a calibrator surface in detectable proximity to said detector;

b. driving a portion of the calibrator surface at a predetermined acceleration in the axial direction in relation to said detector; and c. determining from the output of said hard disk substrate tester whether the output signals correspond to the predetermined acceleration.

16. The method of claim 15 where in the driving step, the calibrator surface is oscillated at at least one predetermined monotonic frequency and at at least one predetermined amplitude.

17. The method of claim 16 where in the driving step, the calibrator surface is oscillated at a plurality of predetermined and selectable monotonic frequencies and at a plurality of predetermined and selectable amplitudes.

18. The method of claim 17 where in the driving step, the oscillation is accomplished by energizing a piezoelectric transducer mounted in operating relationship to said calibrator surface.

19. The method of claim 17 where in the driving step, the predetermined frequencies are selected as representative of a range of frequencies corresponding to axial surface acceleration effects experienced by an airborne slider over the hard disk surface.

20. The method of claim 17 where in the driving step, the calibrator surface is oscillated at a plurality of predetermined and selected monotonic frequencies simultaneously.

* * * * *